United States Patent
Ulmert

(10) Patent No.: US 7,713,419 B2
(45) Date of Patent: May 11, 2010

(54) METHOD FOR TREATMENT OF SLUDGE FROM WATERWORKS AND WASTEWATER TREATMENT PLANTS

(75) Inventor: Hans David Ulmert, Lund (SE)

(73) Assignee: Feralco AB, Helsingborg (SE)

( * ) Notice: Subject to any disclaimer, the term of this patent is extended or adjusted under 35 U.S.C. 154(b) by 647 days.

(21) Appl. No.: 10/990,399

(22) Filed: Nov. 18, 2004

(65) Prior Publication Data
US 2005/0145569 A1 Jul. 7, 2005

Related U.S. Application Data

(63) Continuation of application No. PCT/SE03/00874, filed on May 27, 2003.

(30) Foreign Application Priority Data

May 28, 2002 (SE) ................... 0201594-9
Nov. 26, 2002 (SE) ................... 0203486-6

(51) Int. Cl.
B01D 61/00 (2006.01)
C02F 1/44 (2006.01)
B01D 63/00 (2006.01)

(52) U.S. Cl. .................. 210/650; 210/634; 210/652; 210/638; 210/639; 210/667; 210/723; 210/724

(58) Field of Classification Search .................. None
See application file for complete search history.

(56) References Cited

U.S. PATENT DOCUMENTS 3,959,133 A * 5/1976 Fulton ................. 210/711
4,448,696 A * 5/1984 White, Jr. .............. 210/711
4,689,153 A * 8/1987 Follmann et al. ........ 210/650
5,009,789 A * 4/1991 Helmer et al. ........... 210/641
5,403,490 A * 4/1995 Desai ................... 210/652
5,501,798 A * 3/1996 Al-Samadi et al. ....... 210/652
6,113,789 A * 9/2000 Burke ................... 210/609
6,495,047 B1 * 12/2002 SenGupta et al. ........ 210/638
2002/0179531 A1 12/2002 SenGupta

FOREIGN PATENT DOCUMENTS

JP 60118299 6/1985

OTHER PUBLICATIONS

E. Ernest Lindsey, Charin Tongkasame, Recovery and Reuse of Alum from Water Filtration . . . , AICHE Symposium Series 15 D, New York 1975.

* cited by examiner

Primary Examiner—Krishnan S Menon
(74) Attorney, Agent, or Firm—Capitol City TechLaw

(57) ABSTRACT

A method and construction for treatment of sludge from waterworks and wastewater treatment plants is disclosed. The method for treatment of sludge from waterwork or wastewater treatment plant, comprising precipitated inorganic chemical coagulants and precipitated organic substances, comprises adding an acid to the sludge in such a way that a first sludge mixture with low pH is received. The first sludge mixture includes the inorganic chemical coagulants in solution and the organic substances. The sludge mixture is pumped, via heat exchangers to a pressure tank. An obtained first concentrate is fed to at least one membrane filtration process in which a second concentrate and a first permeate are obtained.

19 Claims, 1 Drawing Sheet

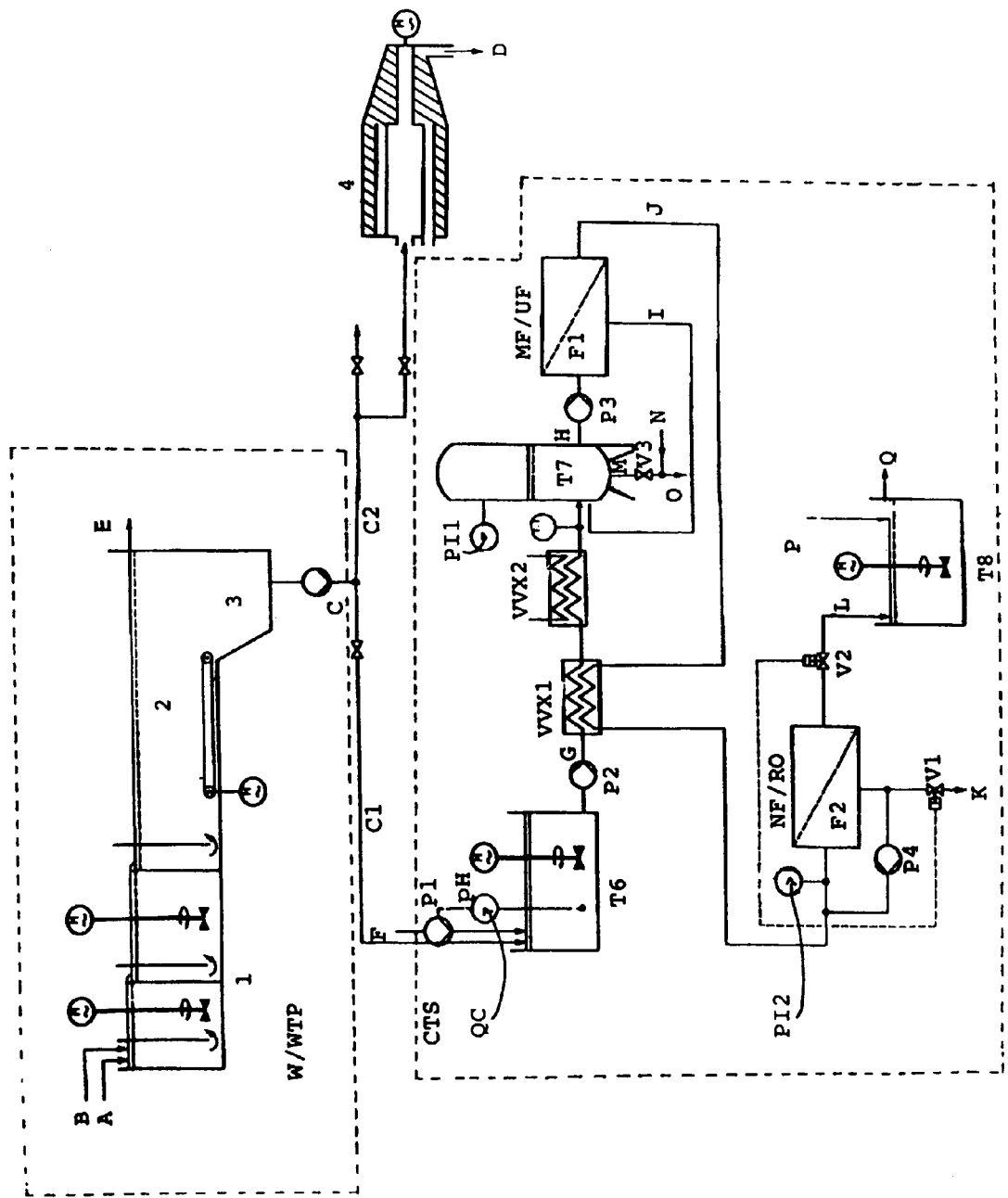

METHOD FOR TREATMENT OF SLUDGE FROM WATERWORKS AND WASTEWATER TREATMENT PLANTS

CROSS REFERENCE TO RELATED APPLICATIONS

This application is a continuation application of International Application No. PCT/SE03/00874, which was filed May 27, 2003, and which was published in English.

AREA OF INVENTION

The invention refers to treatment of sludge from waterwork and wastewater treatment plants. More specifically the invention refers to a method and a plant for treatment of sludge in connection to waterworks and wastewater treatment plants for purifying of water, whereby on one hand chemical coagulants are recovered from the sludge, and this is thereafter further treated and utilised, and on the other hand a simultaneous hydrolysis occur.

BACKGROUND OF INVENTION

When pure water obtained from surface water, in most cases suspended substances and organic material have to be separated. Organic material, which is not as easy to separate, so called humus substances, are brown coloured substances, which are generated during incomplete degradation of dead plants. They are naturally present in varying amounts in lakes and watercourses. Sufficiently pure water may in several cases not be obtained without addition of chemical coagulants, when such humus substances are present in the water, to be purified in waterworks.

A separation of suspended substances lowers the turbidity of the water and a separation of organic substances also improves the taste of the water. During treatment of wastewater there is a need for separating suspended substances and organic impurities. Additionally there is a need for separating phosphorus.

To be able to bring about this separation it is common to add inorganic chemical coagulants, such as trivalent metallic salts of iron or aluminium. The metallic ions hereby forms, under slow stirring, hydroxy-flocks, which encase and adsorb the suspended matter and the organic substances dissolved in water. Additionally the phosphor dissolved in water, together with iron or aluminium, form a sparingly soluble compound, which can be separated.

After terminated flocculation, the formed flock is separated in different ways, such as through flotation/sand filtration, sedimentation/sand filtration or solely sand filtration, at which sludge is formed. In waterworks, it is common that the separated sludge is pumped directly from the plant back to the recipient, to the sludge pond, as a thin sludge. Alternatively the sludge is dewatered, for example in a centrifuge, to thereafter be deposited. In wastewater treatment plants, the sludge is for example dewatered in a centrifuge or the sludge is treated in a digester. In warmer countries, the sludge can be put on a drying bed to thereafter be deposited.

Sludge from wastewater treatment plants is sometimes used as a soil improvement agent, but this method is often criticised as the sludge frequently contains unwanted substances, such as heavy metals.

Feedback of sludge from waterworks to recipient or storage of sludge in the sludge pond may have a negative effect on the environment. Additionally, the transportation and storage of sludge on deposition are costly and have as such a negative effect on the environment. This has been observed by environment organisations as well as authorities, and local prohibitions are already present at this day. Additionally, several countries, there are demands on recycling, if such is possible, and future general prohibitions may thus be expected. Any effective solution to this problem has to this day not been provided.

In the article by E. Ernest Lindsey et al.: "Recovery and reuse of alum from water filtration plant sludge by ultrafiltration" Water 1975 (AIChe symposium, serie 151) New York 1975, a process is described where sludge is acidified, remaining suspended substances are allowed to settle, after which the clarified water is treated in an ultra filtration plant. This method has clear disadvantages. In 1975, when this article was published, membranes and membrane systems were not available, which could handle solutions with not even a very low amount of suspended substances, without a fast creation of an irreversible clogging of the membrane. In an acidified sludge there are suspended organic and inorganic substances, on one hand as particles with a density equal to or lower than water, on the other hand as colloids, which not may be separated by settling. Even if the acidified sludge goes through a process for separation of sludge by settling, the remaining content of suspended substances would strongly reduce the term of life for the types of membranes available in 1975, which implies that the process was uneconomical. Nowadays, for instance, ceramic ultra filtration membranes exist, which solve the task to also filter solutions with a very high contents of suspended substances. This implies that membrane filtration of today may be used on the whole acidified amount of sludge, even in the case where the sludge originate from wastewater treatment plants, where the amount of suspended substances are considerably higher than in sludge from waterworks. The amount of sludge formed during settling of acidified sludge obtains a very low amount of suspended substances, and will constitute a large part of the total acidified amount of sludge. In the sludge, which according to the article has to be separated from the clarified water, simultaneously dissolved aluminium ions are found, which thereby can not be recovered. Furthermore, chemicals are used for neutralising the residual acid and those aluminium ions that are present in the sludge. If it is desired to simultaneously bring about a hydrolysis, a large part of the organic matter is in addition found as dissolved and suspended substances in the sludge.

U.S. Pat. No. 5,304,309 discloses a method for selective recycling of inorganic chemical coagulants in sludge from waterworks, whereby acid at first is added to the sludge in a first tank, a membrane with enclosed ion exchanger is immersed in the acidic sludge to adsorb metallic ions, and the membrane is transferred to a second tank to desorb metallic ions. Such a method is complicated and has very little efficiency in treating large amounts of thin sludge.

DISCLOSURE OF INVENTION

A first object of the invention is to provide a method for treatment of sludge from waterworks or wastewater treatment plants to receive a much more purified residual sludge in a lesser amount than existing methods, whereby its adverse effect on the environment is reduced or eliminated.

A second object of the invention is to provide a method in which chemical coagulants from waterworks and wastewater treatment plants can be recycled and reused, whereby the need of chemical coagulants is considerably reduced.

A third object of the invention is to provide a method in which the need of coagulant agents is reduced.

A fourth object of the invention is to provide a method for increasing the dry matter content and decreasing the total amount of dry matter in the sludge so that lesser material has to be transported and deposited.

A fifth object of the invention is to provide a method for bringing about a sludge which can be used as a soil improvement agent.

A sixth object of the invention is to provide a method which simultaneously utilises a pressurisation and acidification of the sludge, which is necessary to the membrane process to recover aluminium and iron ions, in hydrolysis of the sludge.

A seventh object of the invention is to, by the combination with hydrolysis, receive a sludge which easier may be degraded biologically by treatment in a digester, which thereby gives a higher yield of methane gas (biogas).

An eighth object of the invention is to decrease the total energy consumption by the combination of membrane filtration and hydrolysis, compared to when the processes of membrane filtration and hydrolysis are run separately.

A ninth object of the invention is to get, for instance by decreased viscosity, an increased flux in the construction of micro filtration/ultra filtration, which lowers the investment costs, from heating of sludge.

A tenth object of the invention is to get either a contribution of heat to a subsequent process of digestion or an additional increase to the dry content by way of that water evaporates from the heated concentrate or preheating of the acidified, but otherwise untreated, sludge from the heated concentrate from the construction of micro filtration/ultra filtration.

An eleventh object of the invention is to bring about the best possible hydrolysis by keeping the concentrate of micro filtration/ultra filtration, which contains the separated organic substances, at an elevated pressure and temperature as long as possible.

A twelfth object of the invention is to accomplish as low retention of aluminium and iron ions as possible and as high retention of contaminants as possible.

A thirteenth object of the invention is to utilise the acid, that is added to acidify the sludge, on one hand to dissolve aluminium- and iron hydroxide, on the other hand to hydrolyse the sludge.

A fourteenth object of the invention is to utilise the heat, obtained by the pumps for elevation of pressure and for recirculation, to heat up the acidified sludge, which lowers the energy costs.

A fifteenth object of the invention is to exchange conventional dewatering of the sludge, in a centrifuge or the like, with the suggested method.

A sixteenth object of the invention is to utilise the overpressure to heat up the sludge to temperatures over 100° C., which contributes to a faster hydrolysis.

A seventeenth object of the invention is to get a hygienic sludge from heating.

An eighteenth object of the invention is to achieve complete and fast dissolution of metal hydroxide, especially iron hydroxide, by subjecting it to high temperature.

A nineteenth object of the invention is to leach remaining amounts of iron, aluminium and other dissolved metals, which may be present in small amounts, from the concentrate by adding pure water, instead of acidified sludge, to the pressure tank, when appropriate concentration in the pressure tank has been obtained, to further recover chemical coagulants from the process.

To achieve these objects the method according to the invention has the characteristic features according to claim 1. To be able to accomplish the method according to the invention, a construction is given in claim 20 for treatment of sludge in connection to waterworks or wastewater treatment plants for purifying water.

BRIEF DESCRIPTION OF THE DRAWINGS

Further objects, features and advantages of the invention will appear from the following detailed description of embodiments of the invention with reference to the drawings, in which:

FIG. 1 is a flowchart of an embodiment of a construction for treatment of sludge from waterworks or wastewater treatment plants.

Incoming water A is supplied to waterwork or wastewater treatment plant W/WTP. The water in flocculation basin 1 is allowed under stirring to react with a simultaneously incoming solution B of inorganic chemical coagulants. Usually, the chemical coagulants are aluminium or iron ions, which flocculate suspended substances in the water and organic substances, and for wastewater treatment plants also phosphor. Thereafter the formed flocks are separated in a sedimentation basin 2, where a thin sludge is formed on the base of the basin.

Settled base sludge is scraped or in another way transported to a sludge hopper 3. Received thin sludge C is, in connection to waterworks, either pumped back to the recipient or is dewatered in some way, for example in a centrifuge 4. This centrifuged sludge D has also a relatively low amount of DS (dry substance) (some ten percent). Treated water in wastewater treatment plants is separated as outgoing pure water E.

The sludge D is thereafter deposited. Alternatively, the metal hydroxide formed during flocculation may be dissolved in acid, so that suspended matter and organic substances are set free. The dissolved sludge is filtrated in known fashion by a conventional filter. A conventional filter is however only able to separate parts of the suspended particles, and not any of the organic matter, which is found in the dissolved sludge.

In those cases where the sludge is to be hydrolysed, to receive a smaller amount of residual sludge and to obtain a greater yield of biogas in a subsequent digester, the sludge D is heated under an elevated pressure in a construction of hydrolysis.

According to an embodiment of the invention a received sludge C1 from the waterwork or wastewater treatment plant W/WTP is led to a dissolution-tank T6, for treatment of sludge in connection to waterwork or wastewater treatment plant W/WTP, for purifying water. Sludge from other waterworks or wastewater treatment plants may also be treated in the dissolution-tank T6 according to the invention, which for example is transported thereto by lorry.

According to the invention this feed sludge C1 is subjected to at least one membrane filtration process subsequent to at least one pressure tank process, so that a concentrate and a permeate are received. As a result, said first permeate substantially includes the inorganic chemical coagulants in solution.

To this end the term "membrane filtration process" designates a separation process where the driving force is constituted of a difference in chemical potential over the membrane. The driving force—the chemical potential—may however be achieved in different ways in different membrane processes; it may be an applied pressure, a difference in concentration or temperature, or a difference in electric potential. The mechanism of separation is based on solution theory, at which the solubility and diffusitivity of the dissolved substances in the membrane are decisive.

Different kinds of membranes were used in the different membrane processes. In some processes, membranes with pores (for example micro filtration) were used, while the membranes in the other processes lacked pores (for example reversed osmosis). Some processes depend on the fact that the membranes are charged (for example nano filtration), while the possible charge of the membranes did not influence upon the substantial mechanism of separation in other processes (for example micro filtration).

During ultra filtration (UF), the size of the pores primarily decides what is separated and what passes through the membrane. The mechanism of sieving is accordingly predominant; but the interaction between membrane and the dissolved substances is also of importance. The separation during micro filtration (MF) is completely based on a mechanism of sieving, and the size is totally the determining factor for what will pass through the membrane.

In a MF-device suspended matter and colloids are mainly separated. When using MF a higher flux (flow per membrane area) is often obtained. This alternative is preferably utilised for treatment of sludge, which does not require a high separation of dissolved organic substances, for example if the amount of humus is low. A concentrate is received, which substantially includes in water suspended matter.

MF/UF/NF and RO are membrane processes, where a driving pressure has to be present to divide the feed into a permeate and a concentrate.

For sludge from waterworks, with a lot of humus matter, or for sludge from wastewater treatment plants, which contains a lot of organic matter, the membrane is preferably chosen in such way that also organic molecules are separated. This may be accomplished by choosing an ultra filtration membrane with low retention of spherical ions, such as trivalent aluminium and iron ions, and a high retention of chain shaped molecules, for instance organic substances, such as humus. Accordingly, the filtration through a first device of membrane filtration results in a concentrate of suspended substances and organic compounds and a permeate, substantially consisting of water with inorganic ions, such as $Al^{3+}$ and $Fe^{3+}$, which pass through the relevant membrane. A concentrate is received, which substantially contains in water suspended matter and humus substances and other organic matter.

The permeate, now substantially relieved from substances originally contaminating the water, contains $Al^{3+}$ and $Fe^{3+}$ ions, and may be recirculated as a precipitation agent to the flocculation part of waterworks or wastewater treatment plants or be used as chemical coagulant in another purification plant.

The more or less diluted permeate, which has been treated this way, was then led to a second device of membrane filtration. This second type of membrane filtration is designed in such a way that, except for a permeate, a concentrate is received, which will substantially contain the inorganic chemical coagulants in solution.

The sludge mixture C1 is led, irrespective which type of sludge, to the first dissolution-tank T6 with simultaneous supply of an acid F. Preferably, the acid is sulphuric acid.

In the first dissolution-tank T6, which functions as a dissolver, the acid is stirred so that the metallic hydroxide in the obtained mixture is dissolved, i.e. free metallic ions (substantially $Fe^{3+}$ and $Al^{3+}$) are formed. The addition of acid is adjusted by a pH-meter/regulator QC, which controls a pump P1 for addition of acid. That metallic hydroxide is dissolved and metallic ions are set free when pH is decreased is well known. Dissolution of metal hydroxides, especially iron hydroxide, requires high temperature for a complete and fast dissolution.

Thus, when the metal hydroxide has been dissolved, a sludge mixture G, with low pH, is received, which includes suspended substances, organic substances and inorganic ions, including $Fe^{3+}$ or $Al^{3+}$.

The acidic sludge G is pumped, with the high pressure pump P2, through a heat exchanger VVX 1, at which heat from a MF/UF-permeate J, from a construction of MF/UF F1, is transferred to the acidified sludge. Before the filling of a pressure-tank T7, which is done after that the preceding batch has been completed, the sludge may also be preheated by supplying external heat from a subsequent heat exchanger VVX2. The heat supply is controlled by a temperature meter/regulator, in such a way that the desired temperature is obtained. The maximum temperature is adjusted in such a way that it never exceeds the temperature of evaporation under the present pressure in the conduit for permeate J following the construction of MF/UF F1.

The pressure in the tank T7 is adjusted to such a level that a sufficient differential pressure can be obtained over the construction of MF/UF F1, at the same time as the pressure of the MF/UF-permeate J, i.e. the feed to a subsequent construction of NF/RO F2, is sufficient for the subsequent construction of NF/RO F2 to obtain desired capacity. The pressure is adjusted to a preset level by a pressure meter/regulator PI 1 in the pressure tank T7, which controls the high pressure pump P2 via frequency control.

A feed H, i.e. the warm sludge with increased pressure, is pumped by the pump P3 from the pressure tank T7 to a construction of MF/UF F1 and a concentrate I is led back to the pressure tank T7. The MF/UF-permeate J is led via the heat exchanger VVX 1 to the construction of NF/RO F2. In the heat exchanger VVX 1 the temperature of the feed is decreased to a temperature under 100° C. This means that an outgoing permeate L from the construction of NF/RO F2 does not boil when the pressure is lowered to atmospheric pressure. A pressure meter/regulator PI 2 controls a control valve V1 on the outlet of a concentrate K from the construction of NF/RO F2, such that the a constant preset pressure on the feed is obtained. The difference between this pressure and the pressure in the pressure tank T7 will at the same time constitute the differential pressure over the construction of MF/UF F1. A recirculation of the concentrate K over the construction of NF/RO F2 is also possible by means of a pump P4.

In the case when the permeate flow L from the construction of NF/RO F2 gets larger than the permeate flow J from the construction of MF/UF F1, the pressure on the feed to the construction NF/RO will not be able to be maintained.

The acidic permeate L, from the construction of NF/RO F2, is led to a neutralising tank T8, which is provided with an agitator. A base P, preferably lime or sludge of lime, is added to the neutralising tank T8 until a neutral pH is obtained. A neutralised permeate Q is thereafter tapped off.

As the permeate J, containing aluminium and iron ions, is separated in the construction of MF/UF F1 and new acidified sludge is fed to the pressure tank T7, the concentrate I, which is recirculated, will contain more and more of suspended and dissolved substances. This will imply that the flux, i.e. the flow of permeate J, will decrease. When the flow of permeate J has reached a certain lower limit, the process is interrupted, and a concentrate M in the pressure tank T7 is tapped off by opening a valve V3.

The acidic concentrate is neutralised by adding a base N, in solid or liquid form, to the concentrate M in the tap-off conduit, in such a way that a second sludge mixture O, with at least neutral pH, is received. Preferably the base is calcium oxide or calcium hydroxide.

The received second sludge mixture O may be led to a digestion process, dried by means of evaporation of water or heat exchanged with sludge mixture G.

The batchwise treatment is completed by tapping off the concentrate M from the pressure tank at the same time as the concentrate is neutralised by adding caustic liquor or a lime slurry. The thermal energy, in the warm and pressurised concentrate, may be utilised in different ways. It may preheat the sludge in the acidifying tank. It may be utilised as a source of heat in a subsequent digester. It may be utilised in drying the sludge. This is accomplished by that water will be driven off from the warm concentrate when the pressure is reduced to atmospheric pressure.

When appropriate concentration in the pressure tank has been obtained, there is a possibility to add pure water instead of acidified concentrate I. This brings about that the remaining amounts of iron, aluminium and other dissolved metals, which may be present in small amounts, are leached from the concentrate in the tank T7, to further recover chemical coagulants from the process and to obtain a more purified residual from the tank T7.

The invention relates to batchwise membrane filtration, where acidified sludge is pressurised and the acidified sludge is led to a pressure tank, in which a constant pressure is maintained. A step of pressurisation can give a driving pressure to both constructions when a construction of MF/UF and an optional construction of NF/RO are coupled in series. The pressurisation at the same time permits that the temperature of the sludge/concentrate in the pressure tank may exceed 100° C., on condition that it is restricted in such way that the vapour pressure does not exceed the pressure on the permeate side of the MF/UF-membranes. Acid treatment and elevated pressure and temperature enable an effective hydrolysis of the organic substances in the sludge. Besides pressure, temperature and pH, the reaction time is a factor to obtain maximum hydrolysis of the organic substances. To obtain longest possible dwell time for the MF/UF-concentrate, i.e. the solution which contains the separated organic substances which shall be hydrolysed, the solution is recirculated over the pressure tank. This means that the organic substances, added to the process from the start of a batch, will be hydrolysed under elevated pressure and temperature, to the point at which the concentrate is drawn off, when the batchwise treatment is completed. As the process proceeds, the dwell time for the added organic substances is decreased, but at the same time the amount of organic substances added to the process is decreased. The decreased dwell time may be compensated by a gradually increase of the temperature, in such a way that maximum temperature is obtained first at the end of a batch.

The fact that the construction of MF/UF works at a temperature over 100° C. implies that only temperature resistant membranes, such as ceramic membranes, may be used. A high temperature, and along with that a decreased viscosity, increases the flux, i.e. the amount of flow per m$^2$ membrane area. This implies that the membrane area, which treats a given amount solution, may be decreased, which in turn lowers the investment and running costs.

When the pressure tank has been filled and preset working pressure has been obtained, the input pumping of "cold" acidified sludge will be as large as the amount of warm permeate led off from the construction of MF/UF. Heat is recovered by means of heat exchange from the permeate to the incoming acidified sludge. Heat is continuously added to the system, by means of pressurisation and recirculation pumping. In conventional membrane constructions the thermal energy added through pumping constitutes a loss. In this case the heat is recovered and utilised in the process of hydrolysis. In the case when a construction of NF/RO is connected in series with the construction of MF/UF, only one step of high pressure is utilised to give the driving force to both constructions. As the entire pressurisation occurs before the construction of MF/UF, the heat generated by the pumping step is also utilised to give a driving force to the step of NF/RO of hydrolysis and to increase the flux in the construction of MF/UF.

To increase the concentration of $Al^{3+}$ and $Fe^{3+}$, the permeate, from the device of micro filtration (MF)/ultra filtration (UF), is preferably subjected to nano filtration (NF) or reversed osmosis (RO).

During nano filtration, different compounds are separated according to two principles of separation. Uncharged compounds are separated with regard to size while the retention of ions is due to the electrostatic interaction between ion and membrane. Accordingly, if the MF/UF-permeate is filtrated through a device of nano filtration, in principle only trivalent ions, i.e. $Al^{3+}$ and $Fe^{3+}$, are retained in the concentrate, while ions with lower charge pass through the membrane and can be recovered in the permeate.

If the additional concentration is performed by a device for reverse osmosis, also ions with lower charge are retained in the concentrate, while the permeate is almost free from ions.

The membrane type is chosen with respect to other iron and manganese compounds in the water and with respect to the presence of toxic heavy metals.

The received NF/RO-concentrate may, just as the permeate, be reused directly as chemical coagulant in connected waterworks or wastewater treatment plants. The concentrate may also be transported to another site to be used for example as chemical coagulant in other waterworks or in other wastewater treatment plants. The need of precipitation agents is decreased with 80-90%, which implies a considerable economic advantage.

In the invention, the above mentioned membrane processes are carried out at the same time as an effective hydrolysis of the organic matter in the sludge is obtained. Hydrolysis implies that water molecules are bound in polymeric organic substances, which then are split up into smaller pieces. The decomposition into smaller molecules facilitates subsequent biological decomposition. During normal conditions, a hydrolysis of an organic substance hardly ever occur, when it gets in contact with water. At addition of a strong acid or at an elevated temperature, which at the same time requires a pressurisation of the sludge, or a combination of the two, a hydrolysis of the organic substances, which usually can be found in sludge from waterworks and sludge from wastewater treatment plants, occur almost without exception. Hydrolysis of sludge is a method that, in recent times, is utilised more and more to increase the production of biogas in digester constructions, which at the same time imply that the amount of residual sludge is decreased. The usual hydrolysis procedure, in this context, is thermal hydrolysis. Thermal hydrolysis in combination with addition of acid give a more effective hydrolysis in a shorter period of time. Addition of acid and necessary subsequent neutralisation are however often believed to be too costly. In the present invention the addition of acid, the pressure that the recycling process requires, and the thermal energy that the elevation of pressure generates, are utilised.

Thus, the present invention brings with it that the greater part of the used chemical coagulants, trivalent iron or aluminium, are separated from the organic compounds and suspended substances bound in sludge at the same time as the organic substances are effectively hydrolysed. According to the invention the chemical coagulants may be recovered and the amount of sludge is decreased, since the iron or aluminium hydroxide formed the by the chemical coagulant has been removed. The simultaneously accomplished hydrolysis of the organic substances increases the biological degradability, which partly improves the properties of the sludge as a soil improvement agent, partly increases the production of biogas and further reduces the residual amount of sludge in a subsequent digestion. By this procedure the invention simultaneously replaces a costly investment and operation of a conventional construction of dewatering. The heating of the sludge additionally leads to the fact that the tapped off concentrate is hygienic.

The term "hygienic" denotes that a bacterially contaminated solution is treated in such a way that the risk of transference of infection reaches an acceptable level. The object with the treatment is to kill off vegetative forms of disease generating microorganisms.

The invention has been described above with reference to an exemplary plant. However, the invention may be used in other types of plants and the respective parts and features of the invention may be combined in other ways than described and shown on the drawing. Such modifications appearing to a skilled person reading the present specification are intended to be within the scope of the invention which is merely limited by the appended patent claims.

The invention claimed is:

1. A method for treatment of sludge from waterwork or wastewater treatment plant, comprising precipitated inorganic chemical coagulants and precipitated organic substances, said method comprising the steps of:
   adding an acid to said sludge in such a way that a first sludge mixture with low
   pH is received, which includes said inorganic chemical coagulants in solution and said organic substances;
   pumping said first sludge mixture to a pressure tank, wherein the temperature in the pressure tank exceeds 100° C.; and
   feeding the obtained first concentrate to at least one membrane filtration process in which a second concentrate and a first permeate are obtained, and over which a differential pressure is obtained by adjusting the pressure in the pressure tank.

2. The method according to claim 1, further comprising the steps of:
   pumping said first sludge mixture by a pump; and
   adding heat to said pressure tank.

3. The method according to claim 1, further comprising the step of:
   mixing said sludge mixture with the second concentrate from at least one membrane filtration process.

4. The method according to claim 1, further comprising the step of:
   repeating said first membrane filtration process with said second concentrate as said first sludge mixture.

5. The method according to claim 1, further comprising the step of:
   performing heat exchange between said first permeate and said first sludge mixture.

6. The method according to claim 1, further comprising the step of:
   driving both said first membrane filtration process and a second membrane filtration process by elevated pressure.

7. The method according to claim 1, further comprising the step of:
   pumping said first sludge mixture at the same amount of flow as said first permeate.

8. The method according to claim 1, wherein said first membrane filtration process is ultra filtration and/or micro filtration.

9. The method according to claim 1, further comprising the step of:
   feeding said first permeate to a second membrane filtration process, so that a third concentrate and a second permeate are obtained, at which said third concentrate substantially includes said inorganic chemical coagulants in solution.

10. The method according to claim 9, wherein said second membrane filtration process is nano filtration and/or reversed osmosis.

11. The method according to claim 9, further comprising the step of:
    adding a base to said second permeate in a neutralization tank.

12. The method according to claim 1, wherein said inorganic chemical coagulants in solution are trivalent aluminum and/or iron ions.

13. The method according to claim 1, further comprising the step of:
    adding a base to a fourth concentrate tapped off from the pressure tank so that a second sludge mixture with at least a neutral pH is obtained.

14. The method according to claim 13, wherein said base is calcium oxide or calcium hydroxide.

15. The method according to claim 13, further comprising the steps of:
    feeding said second sludge mixture to a digestion process; or
    drying said second sludge mixture by means of evaporation of water from the heated second sludge mixture.

16. The method according to claim 1, further comprising the step of:
    heat exchanging said second sludge mixture with the first sludge mixture.

17. The method according to claim 1, wherein said second concentrate comprises hydrolyzed organic substances and is hygienic.

18. The method according to claim 1, wherein said first permeate comprises said inorganic chemical coagulants in solution.

19. The method according to claim 1, further comprising the step of:
    adding pure water to said pressure tank to further recover said inorganic chemical coagulants.

* * * * *